Oct. 30, 1962   N. R. NELSON   3,060,823
PRECISE LIGHT METERING MEANS FOR SINGLE LENS REFLEX CAMERAS
Filed July 14, 1960   2 Sheets-Sheet 1

INVENTOR.
NOEL R. NELSON
BY
Walter S. Paul
ATTORNEY

Oct. 30, 1962 N. R. NELSON 3,060,823
PRECISE LIGHT METERING MEANS FOR SINGLE LENS REFLEX CAMERAS
Filed July 14, 1960 2 Sheets-Sheet 2

INVENTOR.
NOEL R. NELSON
BY
Walter S. Paul
ATTORNEY

United States Patent Office 3,060,823
Patented Oct. 30, 1962

3,060,823
PRECISE LIGHT METERING MEANS FOR SINGLE LENS REFLEX CAMERAS
Noel R. Nelson, 7810 Greenwood Ave., Takoma Park, Md.
Filed July 14, 1960, Ser. No. 42,856
3 Claims. (Cl. 95—10)

The present invention relates to novel combinations of single-lens reflex cameras and lightmeters for obtaining precise exposure setting in accordance with the average light density in the exposure area of the camera at the time of the exposure.

The object of this invention is to improve the method of measuring the light projected from a scene or object area to be photographed, so that more precise exposure settings may be made on the camera, whereby more perfect photographs and less rejects might be produced.

A further object is to place the photo-cell of the lightmeter behind the lens across substantially the entire section of the light beam passing through the lens, without interfering with the normal transfer of the light beam to the exposure surface.

A further object is to place the photo cell of the lightmeter back of a reflecting surface in the path of the viewer light beam of a single-lens reflex camera.

A further object is to obtain precise lightmeter indications in a single-lens reflex camera using a reflecting prism in the viewer system, by placing the photo-cell of the lightmeter on or adjacent to an unsilvered or only partially silvered reflecting surface of said prism.

Figure 1:
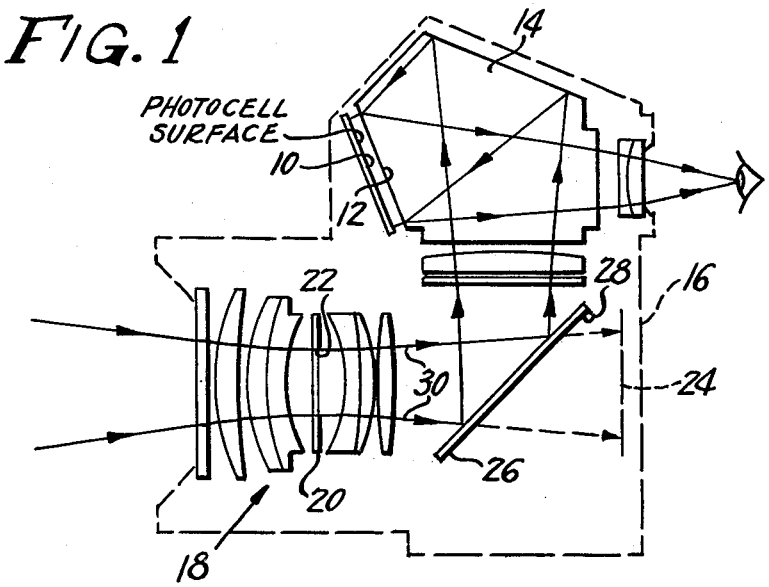

Other and more specific objects will become apparent in the following detailed description of several adaptations of this invention to known single-lens reflex camera systems, as illustrated in the accompanying drawings, wherein:

FIG. 1 is a diagrammatic illustration of the adaptation of a possible photo-cell arrangement in combination with the pentaprism reflecting surfaces of a Japanese Nikon Model F single lens reflex camera.

Figure 2:
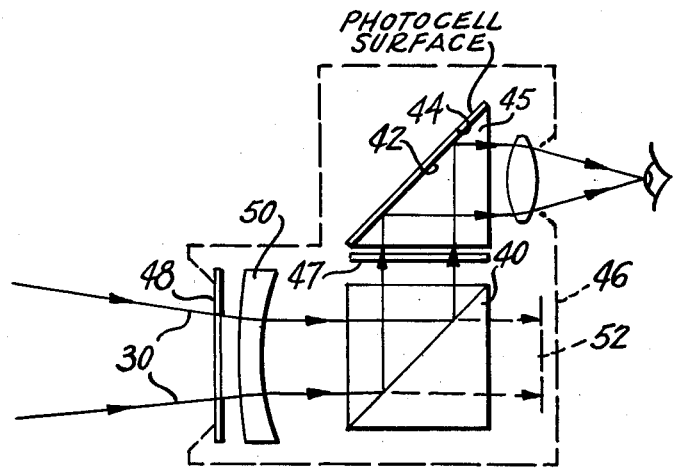
Figure 3:
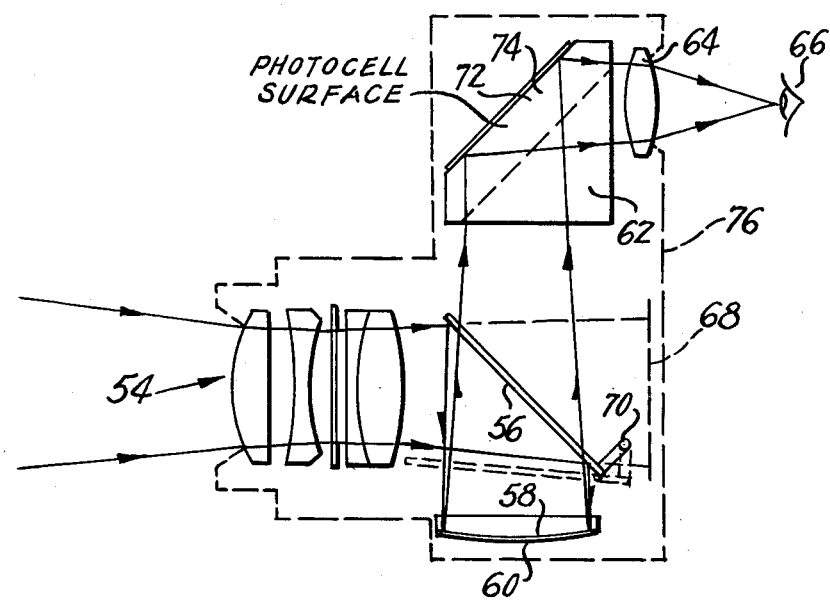
Figure 4:
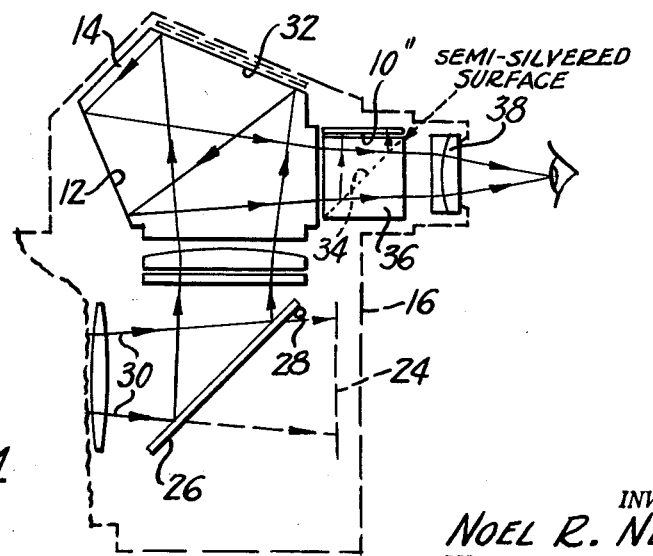

FIG. 2 is a similar illustration of the photo-cell arrangement on the viewer reflector of a Swiss Bolex type of single lens reflex camera, FIG. 3 is a similar illustration of the adaptation of the photo-cell arrangement on the roof prism reflecting surfaces of the French Focaflex single lens reflex camera, and FIG. 4 is a similar illustration of the adaptation of another possible arrangement in combination with the pentaprism viewer of the Japanese Nikon Model F having an additional reflector prism for directing a portion of the viewer beam to the photo-cell outside of the viewer path.

The present invention is particularly adapted for use with single-lens reflex cameras such as the Nikon Model F, the Exakta, the Asahi Pentax, and many other 35 mm. single-lens reflex cameras which feature interchangeable lenses of varying focal lengths and prism-type viewfiinding systems.

It is well known that lenses of varying focal lengths have different cone angles. For example, the so-called normal focal length 50 mm. $f$ 1.4 Nikkor lenses has a cone angle of approximately 46°, at the long focal length extreme, the 500 mm. $f$ 5 Nikkor lens has a cone angle of approximately only 5°. The cone angles for intermediate focal length lenses logically range between these extremes.

It has been determined by experimentation that the angle of acceptance of the average photoelectric exposure meter is about 60°. This means that the average meter accepts light in about a 60° cone angle area (at least in the horizontal direction) and so meters the exposure from an area much wider than even the normal 50 mm. lens takes in. This presents certain obvious difficulties in determining proper and true exposure intelligence and these difficulties become progressively more pronounced when longer focal length lenses are used.

The present invention avoids these difficulties by measuring the exposure from the area in substantially the same cone angle which is accepted by whatever lens is being used. The small unrestricted portion of the entire cross section of the beam passing through the lens from the entire subject area is intercepted and sampled by the photo-cell at the back of any unsilvered or partly silvered prism reflecting surface in the path of the beam on its way through the camera lens and viewfinder.

Any suitable reflecting surface in the viewer path may be selected in the single-lens reflex camera of any type, for this purpose, and the photo-cell either incorporated in this reflecting surface or placed adjacent or fixed directly to this surface, after removing any silver from a previously silvered surface, so as to receive substantially the entire cross section of the portion of the beam which is not reflected by said unsilvered surface but which normally is lost by passing through said surface. This normal loss is in proportion to the portion which is reflected, so that its measure indicates a precisely proportionate value of the entire light beam and of the average exposure over substantially the entire image area. Obviously, the reflecting surface could be partly silvered, in which case the normal loss would be reduced, but would still be proportional to the reflected portion, and therefore would maintain a precise relation to the value of the entire light beam, of which it would be a correct measure.

In FIG. 1 the photo-cell surface 10 is held adjacent to the outside of the reflecting surface 12 of the pentaprism 14. The silver coating on the outside of this surface has been removed so that a definite portion of the viewer light beam passes through the surface and is not reflected. The outline of the camera 16 is shown in dotted lines and the arrangement of the elements as used in the Japanese Nikon F camera are shown diagrammatically to illustrate the novel adaptation of the present invention. The lens system 18 has an automatic diaphragm 20 for controlling the aperture 22. The image exposure surface is indicated at 24. The mirror 26 is hinged at 28 and is raised to a horizontal position when making an exposure, during which the diaphragm is stopped down to the desired aperture. After an exposure the diaphragm is automatically opened and the mirror returned to the viewing position, as shown in FIG. 1.

The outline of the beam passing through the camera lens aperture and reflected through the viewer is indicated by the solid arrow lines 30. At the reflecting surface 12, the normally lost portion of the light beam which is not reflected, but which passes through this uncoated or lightly coated surface 12, is intercepted by the photo cell surface 10 to measure the intensity of the light beam from the subject source. The photo cell surface 10 is suitably connected to a light meter (not shown) having an indicator scale graduated to indicate the intensity across the precise area of the entire light beam, which is directly proportional to that of its lost portion sampled by the photo cell.

Another possible arrangement of the photo cell in the Nikon Model F camera is shown in FIG. 4, where the silvered surface 12 may be left intact, and a semi reflecting surface 34 introduced in a beam-splitting prism 36 between the pentaprism 14 and the viewer eyepiece 38, for reflecting a percentage of the precise area of the entire light beam up to the photo cell surface 10''.

In cameras using a semi-reflecting prism 40, as shown in FIG. 2, for continuous viewing even during exposures, the photo cell surface 42 may be placed on the back of the reflecting surface 44 of the reflecting prism 45 in the viewfinder. This camera 46 has the aperture diaphragm 48 in front of the lens 50, and 52 indicates the location of the image exposure surface. The arrow lines outline the light beam as in the other figures. The viewfinder screen 47 is mounted to receive the image over the semi-reflecting prism 40.

In the French Focaflex camera, in FIG. 3, the image formed by the lens 54 is directed by a semi-reflecting mirror 56 downwardly onto a plano-convex silvered mirror 58 where the image is actually formed and focused with the aid of a split-image, rectangular mirror rangefinder 60. This image is then transmitted upward through the roof prism 62 and then magnified by a typical meniscus lens 64 before it reaches the observer's eye 66. The exposure surface is indicated by 68. During exposure the semi-reflecting mirror swings downwardly, about pivots 70 over the plano convex mirror. The photo cell surface 72 may be placed on or adjacent the unsilvered reflecting surfaces 74 of the roof prism.

Many obvious modifications in the adaptations of the photo cell arrangements to various types of viewfinders may be made without departing from the spirit and scope of the present invention, as defined in the appended claims.

What is claimed is:

1. A single lens reflex camera having a viewfinder system including a reflector prism with sufficient transparency in its reflecting surface for transmitting the viewfinder image light, and a lightmeter having a stationary photo cell mounted in front of said reflecting surface and shielded to intercept and measure only the reflected portion of the entire light beam passing through said viewfinder system, whereby a precise measure of the light intensity across the entire beam framed by the camera may be obtained simultaneously with the viewing operation.

2. A single lens reflex camera having a viewfinder system for reflecting a framed image to a viewfinder screen corresponding to the image to be exposed on the exposure surface for which the camera is set, at least one prism element in said system having a semi-reflecting surface with sufficient transparency to transmit the viewfinder image light, whereby to provide for the reflection of the remaining portion of the entire framed image beam, and a lightmeter having a stationary photo cell surface mounted in front of said partially reflecting surface and shielded to receive only said reflected portion of said framed beam for a precise measurement of the light intensity of the entire framed image for which the camera is set during the viewing operation.

3. A single lens reflex camera having a viewfinder system, a pentaprism having two fully reflecting surfaces in said viewfinder system, an eyepiece for said viewfinder back of said pentaprism, a beam-splitting prism with a 45° semi-reflecting surface between said pentaprism and said eyepiece, and a lightmeter having a photo cell surface mounted on the side of said beam-splitting prism to receive the reflected portion of the entire framed image beam from said 45° semi-reflecting surface to measure the precise intensity of the entire framed exposure for which said camera is set.

References Cited in the file of this patent

UNITED STATES PATENTS

| 1,993,084 | Brewer | Mar. 5, 1935 |
| 2,297,428 | Nuchterlein | Sept. 29, 1942 |
| 2,754,735 | Meyer | July 17, 1956 |
| 2,784,654 | Meyer | Mar. 12, 1957 |
| 2,933,991 | Sauer | Apr. 26, 1960 |

FOREIGN PATENTS

| 969,693 | Germany | July 3, 1958 |
| 970,379 | Germany | Sept. 11, 1958 |